May 24, 1932.   E. E. EICKMEYER   1,859,916
VALVE
Filed June 28, 1929
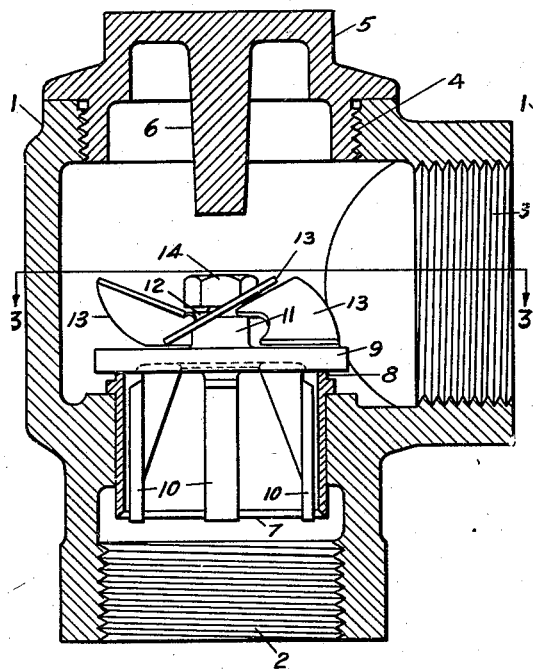
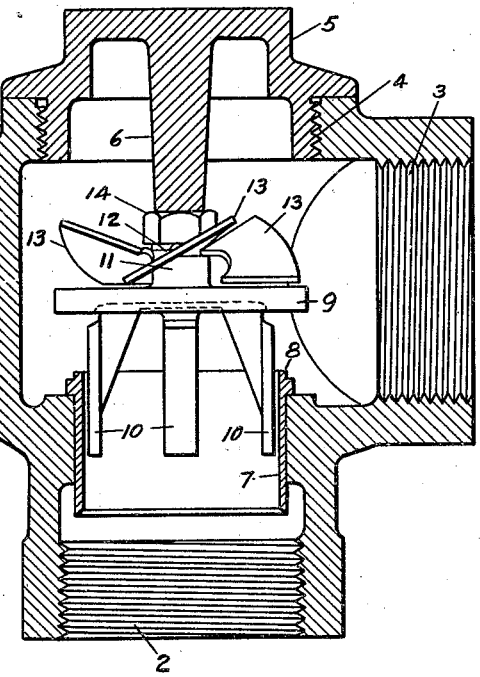
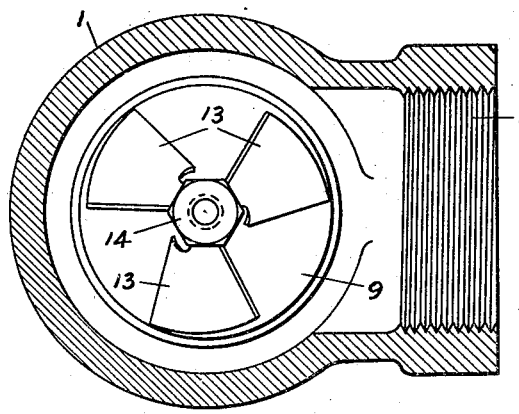
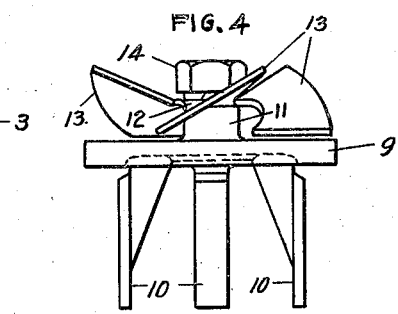
INVENTOR
EARL E. EICKMEYER.
BY Toulmin & Toulmin
ATTORNEYS Patented May 24, 1932

1,859,916

UNITED STATES PATENT OFFICE

EARL E. EICKMEYER, OF DAYTON, OHIO, ASSIGNOR TO THE DAYTON PUMP AND MFG. CO., OF DAYTON, OHIO, A CORPORATION OF OHIO

VALVE

Application filed June 28, 1929. Serial No. 374,388.

This invention relates to improvements in valves, and particularly relates to improvements in valves for the purpose of rotating and properly seating the valve and removing any foreign matter that may accumulate between the valve and its seat.

This invention more particularly relates to a form of float valve to which there is attached means for rotating the valve so that any foreign matter accumulated between the valve and its seat may be removed, so that there will be no obstruction to the proper seating of the valve. A valve of this kind is especially adapted for use in connection with delivery pipes from submerged tanks to delivery tanks for the purpose of delivering gasoline to customers, or for other similar purposes. The valve is automatically operated, and usually located below the upper surface of the ground.

For the purpose of illustration there is shown in the accompanying drawings a preferred embodiment of this invention.

Referring to the drawings:

Figure 1 is a vertical section through the valve casing showing the valve seated.

Figure 2 is a similar section showing the valve unseated.

Figure 3 is a section on the line 3—3 of Figure 1.

Figure 4 is a side view of the valve showing the propeller blades for rotating the valve.

The valve casing is designated by the numeral 1 and is more or less circular in shape, having extending therethrough an opening. Each end of this opening is screw threaded. The one designated by the numeral 2 is used as an inlet. Extending at right angles from this opening is another opening 3, used as an outlet. The end of the opening opposite that designated by the numeral 2 is indicated by the numeral 4 and is screw threaded for the purpose of receiving a screw threaded plug 5. The casing may be made of any suitable material, cast iron or some other metal. The plug is usually made of brass.

Extending from the central part of the plug and extending within the opening is a projection 6. The inlet end of this opening has therein a lining 7, which performs the function of being a seat for the valve. The seat part of this lining is indicated by the numeral 8.

The valve itself is indicated by the numeral 9 and has extending from near the outer edge and perpendicular to the valve body a plurality of guide fingers 10. The valve itself is in the form of a disc and fits over the inside end of the valve lining 7, and forms therewith a close liquid-tight closure. The fingers 10 fit within the lining and guide the valve as it is moved from and seated upon the valve seat.

Extending from the central part of the valve disc on the side opposite the fingers 10 is a boss 11. Upon this boss is located a disc 12, which has extending therefrom a plurality of propeller blades 13. For the purpose of holding this disc upon the boss 11 the boss is screw threaded to receive a nut 14, which is screwed into engagement with the propeller disc 12.

As the gasoline or other fluid passes in through the inlet the valve is elevated so that the gasoline passes through the casing and out through the outlet 3. At the same time the valve is stopped by engagement with the projection 6 so that the fingers 10 are at all times in engagement with the lining 7 of the inlet. While the gasoline or other liquid is thus passing through the inlet and the outlet, the gasoline comes in contact with the blades 13 and rotates them and thereby rotates the whole valve so that any accumulated grit or dirt that may have lodged on either the valve or the seat surfaces may be removed so that whenever the valve seats there will be no obstruction between the valve and the valve seat, and there will be a perfect closure formed between the two.

It frequently happens, where valves of this kind are seated at all times in the same position, that particles of grit may accumulate at one particular point and wear away the valve or the seat so there cannot be thereafter a complete and perfect closure between the two. By having a rotating valve that removes any accumulated grit and dirt this local wearing of either is prevented.

The lining of the inlet that forms the valve seat is composed of any suitable material. In the present instance it is composed of brass and forms with the brass valve a perfect closure to prevent the passing of liquid from the outlet back through the casing and out at the inlet.

I desire to comprehend within my invention such modifications as may be clearly embraced within my claims and the scope of my invention.

Having thus fully described my invention, what I claim is new and desire to secure by Letters Patent, is:

1. In a valve structure, a casing having an opening therethrough, one end of said opening forming an inlet for liquid and the other end being threaded, a second opening in said casing at right angles to the first named opening and forming an outlet, a plug for the threaded end of the first opening, said plug having an inwardly extending projection thereon, a float valve having a boss for said inlet, said valve having a plurality of guide fingers fitting within said inlet, said boss being adapted to engage said projection to limit the movement of the valve whereby the fingers are kept in engagement with the inlet, and means on said boss to cause the rotation thereof by the flow of liquid through the casing.

2. In a valve structure, a casing having an opening therethrough, one end of said opening forming an inlet for liquid and the other end threaded, a second opening in said casing at right angles to the first named opening and forming an outlet, a plug for the threaded end of the first opening, said plug having an inwardly extending projection thereon, a float valve having a boss for said inlet, said valve having a plurality of guide fingers fitting within said inlet, said projection being adapted to engage said boss and to form a stop to limit the movement of said valve whereby the fingers are kept in engagement with the inlet, and blade means removably attached to said boss to cause the rotation thereof by the flow of liquid through said openings.

3. In a valve structure, a casing having an opening therethrough, one end of said opening forming an inlet for liquid and the other end threaded, a second opening in said casing at right angles to the first named opening and forming an outlet, a plug for the threaded end of the first opening, said plug having an inwardly extending projection thereon, a float valve having a boss for said inlet, said valve having a plurality of guide fingers fitting within said inlet, said projection being adapted to engage said boss and form a stop to limit the movement of said valve whereby the fingers are kept in engagement with the inlet, and a disc having a plurality of radially extending blades thereon removably attached to said boss to cause the rotation thereof by the flow of liquid through said openings.

In testimony whereof, I affix my signature.

EARL E. EICKMEYER.